United States Patent
Skoufis

(10) Patent No.: US 7,961,431 B2
(45) Date of Patent: Jun. 14, 2011

(54) ADDITIVE-FREE FIBER FOR METAL TEXTURE OF HARD DISK DRIVES

(75) Inventor: John Skoufis, Denville, NJ (US)

(73) Assignee: Illinois Tool Works Inc., Glenview, IL (US)

( * ) Notice: Subject to any disclaimer, the term of this patent is extended or adjusted under 35 U.S.C. 154(b) by 632 days.

(21) Appl. No.: 11/047,035

(22) Filed: Jan. 31, 2005

(65) Prior Publication Data

US 2005/0248883 A1 Nov. 10, 2005

Related U.S. Application Data

(60) Provisional application No. 60/567,887, filed on May 4, 2004.

(51) Int. Cl.
*G11B 15/10* (2006.01)
(52) U.S. Cl. .................................................. 360/137
(58) Field of Classification Search .................. 360/137; 428/141, 426; 451/36; 66/171, 202; 369/272.1
See application file for complete search history.

(56) References Cited

U.S. PATENT DOCUMENTS

| | | | |
|---|---|---|---|
| 4,106,313 A * | 8/1978 | Boe | 66/202 |
| 5,307,593 A | 5/1994 | Lucker et al. | |
| 5,437,779 A | 8/1995 | Shige et al. | |
| 5,586,926 A | 12/1996 | Wedell et al. | |
| 5,863,609 A | 1/1999 | Yamamoto | |
| 5,877,098 A | 3/1999 | Tanaka et al. | |
| 6,287,449 B1 | 9/2001 | Horie et al. | |
| 6,315,638 B1 | 11/2001 | Marukawa | |
| 6,533,644 B1 * | 3/2003 | Horie et al. | 451/36 |
| 7,138,175 B2 * | 11/2006 | Saito | 428/304.4 |
| 2002/0013984 A1 | 2/2002 | Makiyama et al. | |
| 2003/0013382 A1 | 1/2003 | Tanaka et al. | |
| 2003/0226378 A1 | 12/2003 | Okuyama et al. | |
| 2004/0112867 A1 * | 6/2004 | Horie et al. | 216/89 |
| 2005/0008822 A1 * | 1/2005 | Miyamoto et al. | 428/141 |
| 2006/0003170 A1 * | 1/2006 | Saito et al. | 428/426 |
| 2006/0053837 A1 * | 3/2006 | Oya | 66/171 |
| 2006/0062129 A1 * | 3/2006 | Saito et al. | 369/272.1 |

FOREIGN PATENT DOCUMENTS

| | | |
|---|---|---|
| FR | 1471817 | 12/1966 |
| GB | 923126 | 4/1963 |
| GB | 1006005 | 11/1965 |
| JP | 60-20864 | 2/1985 |
| JP | 5-220670 | 8/1993 |
| JP | 5-285854 | 11/1993 |
| JP | 9-262775 | 10/1997 |
| JP | 10-146754 | 6/1998 |
| JP | 2001-1252 | 1/2001 |
| WO | 99/10569 | 3/1999 |
| WO | 00/19419 | 4/2000 |

OTHER PUBLICATIONS

International Search Report Dated Jun. 2, 2005.

* cited by examiner

*Primary Examiner* — David D Davis
(74) *Attorney, Agent, or Firm* — Levenfeld Pearlstein, LLC

(57) ABSTRACT

A fabric for forming a storage media disk texturing member is formed from a non-woven polymeric material formed from fibers and having substantially no titanium dioxide. A method for texturing a surface of a metal storage media disk is also disclosed.

5 Claims, 1 Drawing Sheet

ADDITIVE-FREE FIBER FOR METAL TEXTURE OF HARD DISK DRIVES

CROSS-REFERENCE TO RELATED APPLICATION DATA

This application claims priority to provisional U.S. Patent Application Ser. No. 60/567,887, filed May 4, 2004.

BACKGROUND OF THE INVENTION

The present invention pertains to fabrics. More particularly, the present invention is directed to an additive-free fabric for texturing the surfaces of hard disk drives.

In the manufacture of storage media, such as hard disks (in hard disk drives), the surfaces of such disks must be textured to provide a surface that is smooth and free of defects. As the storage capacity of these disks increases, so does the manufacturing specifications for the disk surface.

Nylon is a popular material that is used for the fabric for providing a textured surface for the disks. Nylon fiber that is manufactured for fabrics is typically spun from polymer that incorporates titanium dioxide ($TiO_2$) at varying levels in the melt during extrusion and pelletizing. The additive is used to provide processing ease, rheology characteristics, light inhibition, and for delustering.

Additive free fibers are known, however, these fibers are near transparent and possess a high degree of shine, both of which are undesirable for general fabric use. As such, these full bright fibers are used only in specialty applications.

It has been found that scratching of finely textured metal media that is used in the manufacture of hard disk drives (e.g., Winchester Drives) is becoming an increasing problem as the surfaces become smoother and smoother, falling below 5 angstroms.

Minute scratches that were not problematic at higher roughness averages create high rates of failure with state of the art recording media. It has been found that using available texturing tapes, without the abrasives used to achieve a textured surface, creates fine scratches similar to those seen on failed disks. It is believed that the titanium dioxide used in the fiber is a causative factor.

Known fabrics use standard titanium dioxide filled fiber that has been shown to produce high scratch levels. These scratches produced results that created unacceptable surfaces for advanced disk drives of 120 gigabytes per square inch.

Titanium dioxide free fabric may have been used in glass media applications. The reason for using such an additive free fiber in glass media applications is not related to scratching but rather to controlling contamination of the glass surface by abraded fiber. The underlying fiber used in the glass media application was polyester.

Accordingly, there is a need for an additive-free fiber for use in fabrics for disk surface texturing. Desirably such a fabric is based upon known fabrics (fibers) and is readily manufactured. More desirably, use of such a fabric results in reduced surface scratching, providing disk recording capacities commensurate with those that technology permits.

BRIEF SUMMARY OF THE INVENTION

A fabric for forming a storage media disk texturing member is formed from a non-woven polymeric material formed from fibers and having substantially no titanium dioxide. A preferred fabric is formed having a denier of less than or equal to about 0.02, and more preferably, about 0.01 to 0.02.

The fabric polymer can be a combination of nylon and polyurethane, with the nylon and polyurethane present in a ratio of about 1:1 to about 3:1.

A method for texturing the surface of a metal storage media disk includes the steps of providing a fabric formed from a non-woven polymeric material formed from fibers and having substantially no titanium dioxide, bring the fabric into contact with the disk and moving the fabric or the disk relative to the other of the fabric and the disk, to texture the surface of the disk.

The method can include introducing a fluid, such as an abrasive/lubricant slurry between the disk and the fabric. The fabric is provided as a tape having a denier of less than or equal to about 0.02, and preferably about 0.01 to 0.02.

A present fabric is formed from nylon and polyurethane present in a ratio of about 1:1 to about 3:1.

The method includes rotating the disk in a rotational plane and oscillating the disk in a plane coplanar with the rotational plane. The tape is moved in a linear direction, in a plane parallel to the plane of rotation.

These and other features and advantages of the present invention will be apparent from the following detailed description, in conjunction with the appended claims.

BRIEF DESCRIPTION OF THE SEVERAL VIEWS OF THE DRAWINGS

The benefits and advantages of the present invention will become more readily apparent to those of ordinary skill in the relevant art after reviewing the following detailed description and accompanying drawings, wherein.

DETAILED DESCRIPTION OF THE INVENTION

Figure 1:
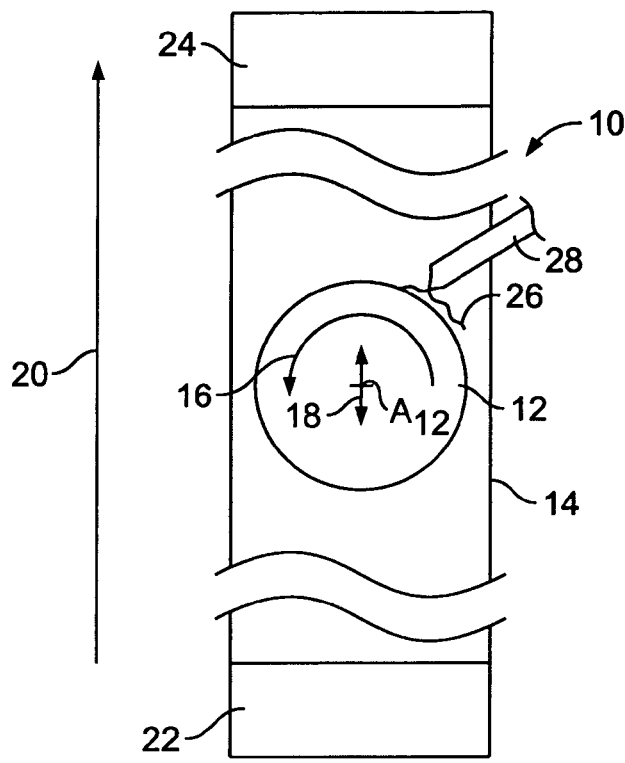
FIG. 1 is a schematic illustration of device for texturing the surface of a metal storage media disk showing a fabric in accordance with the principles of the present invention.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated.

It should be further understood that the title of this section of this specification, namely, "Detailed Description Of The Invention", relates to a requirement of the United States Patent Office, and does not imply, nor should be inferred to limit the subject matter disclosed herein.

A present additive free form of texture fabric is a titanium dioxide free nylon fabric. The fabric greatly reduced (and essentially eliminates) the primary cause of media scratching, which is fiber attributed. The lower level of scratching results in a higher yield and higher attainable recording capacity not possible, or with great difficulty, with standard fibers. Those skilled in the art will recognize that the surface of a (storage media) disk is textured, having a controlled level, in depth, width and density, of "scratches". Although the term scratches is used in this context in connection with the texturing, those skilled in the art will understand that texturing is not scratching per se, and that scratches (which are undesirable), are deeper and more random than texturing, which is more of a surface phenomena and which is patterned and controlled.

It has been found that a fabric of between 0.01 and 0.02 denier that is prepared without titanium dioxide exhibits surprisingly lower scratching than corresponding titanium dioxide containing fiber fabrics. It has also been found that a fabric formed from nylon and a polyurethane exhibits the necessary structural or physical stability for use in media disk manufacture. Present fabrics utilized for texture have nylon to polyurethane ratios of about 50/50 to about 75/25 which provides suitably stable fabrics. Other ratios are within the scope and spirit of the present invention.

The texturing of disks is carried out using a device 10 such as that schematically illustrated in FIG. 1, in which a disk 12 is brought into contact with a fabric 14 such that the disk 12 and fabric 14 are moving relative to one another. In a present arrangement, the disk 12 is brought into contact with a fabric tape such that relative movement between the disk 12 and tape 14 is a rotational movement as indicated at 16 and an oscillating movement as indicated at 18. That is, the disk 12 is rotated about an axis $A_{12}$ (into and out of the figure) that also moves so that oscillation 18 is in the same plane as the plane of rotation 16. At the same time, the fabric 14, (which is formed as a member such as the illustrated tape), moves, as indicated at 20, being fed from a supply roll 22 to a take-up roll 24 such that the tape 14 continuously moves.

In addition to the relative movements of the disk 12 and tape 14 (fabric), a fluid, such as a slurry indicated generally at 26, is introduced from a slurry supply 28, between the disk 12 and tape 14 to affect texturing (e.g., to affect roughness of the disk 12) and to reduce friction between the disk 12 and tape 14. A present slurry 26 is both an abrasive and a lubricant.

Figure 2:
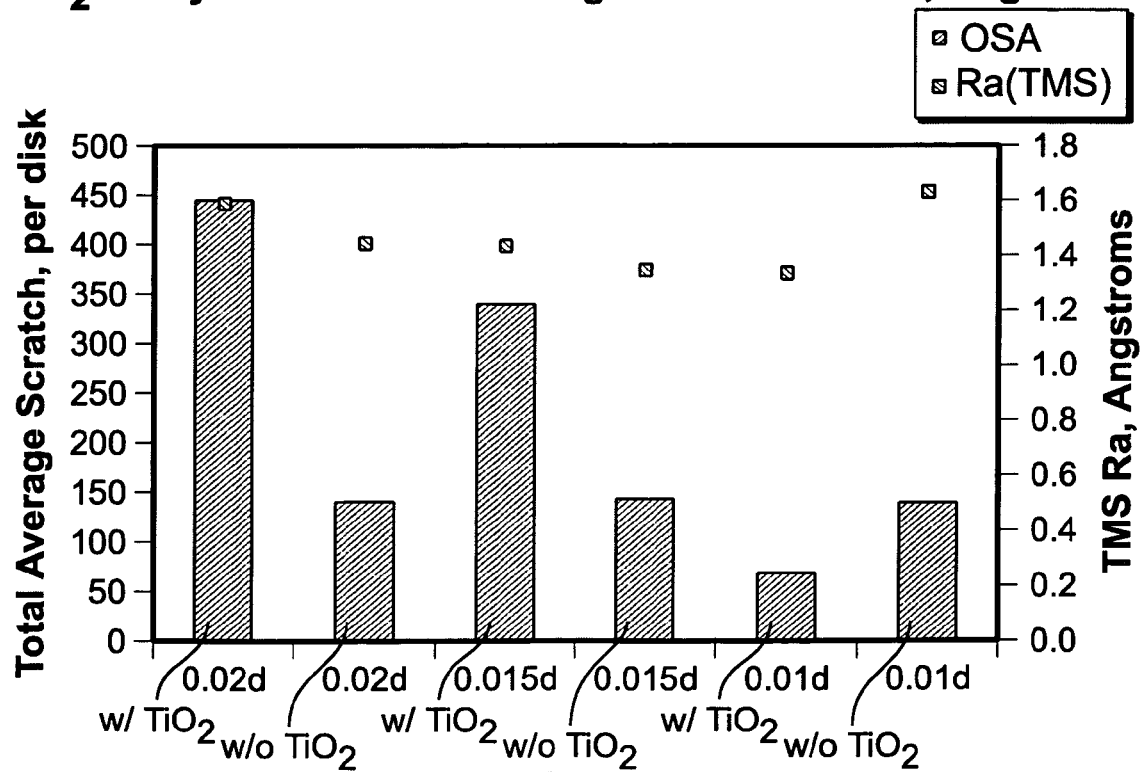
FIG. 2 is a graphical illustration of the results of OSA and Ra values for comparisons of various denier materials with and without $TiO_2$ in the tape fiber, in which the OSA values are illustrated as the large bars extending upward from the x-axis and the Ra values are the blocks generally above the OSA values.

FIG. 2 is a graphical representation of the total average scratches (Ra) for various denier fabrics, with and without $TiO_2$, in which d represents denier, OSA represents Optical Surface Analyzer (presently used are a Candela Model 5100, and others) to locate, count, and measure undesirable scratch levels (indicated as total average scratches per disk OSA) on surfaces (as compared to the desired texturing), which is indicated as Ra (TMS): Ra which is the statistically derived average used in media manufacture to measure the degree of roughness, or conversely smoothness, typically expressed as angstroms (a unit of length equal to 10E-10 meters) and stands for "Roughness average". It will be understood by those skilled in the art that the desired roughness of a disk is predetermined level depending upon certain factors, for example, the type of material (metal) from which the disk is formed and the desired storage capacity, and is generally provided is a desired "band". TMS is the instrument used in the measurement. A presently used instrument is a Model TMS 2000-RC made by Schmitt Measurement Systems. This instrument uses a non-contact procedure so as not to disturb the surface.

As can be seen from the results, the fabrics at 0.02 and 0.015 denier, the showed significantly less scratches (OSA values of about 174 and 144, respectively total average scratches per disk and an average roughness Ra(TMS) of less than 0.6 Å) compared to the same materials containing $TiO_2$ (about 444 and 339, respectively with an average roughness of over 1.6 Å and 1.2 Å respectively). At 0.01 denier, the $TiO_2$ containing material exhibited a lower total average scratches (about 65 as compared to about 145) than the $TiO_2$ free fabric. This is believed to be due to the reduced scratching attributed to the lower denier value fabric.

All patents referred to herein, are hereby incorporated herein by reference, whether or not specifically done so within the text of this disclosure.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. A fabric for forming a storage media disk texturing member, comprising:
   a non-woven polymeric material formed from fibers, having substantially no titanium dioxide and having a denier of about 0.01 to about 0.02, and configured to produce an average surface roughness of about 0.2 Å to about 0.6 Å on a storage media disk.

2. The fabric in accordance with claim 1 wherein the fabric is formed having a denier of about 0.01 to 0.02.

3. The fabric in accordance with claim 1 wherein the fabric is formed from nylon and polyurethane.

4. The fabric in accordance with claim 3 wherein the fabric contains nylon and polyurethane in a ratio of about 1:1 to about 3:1.

5. The fabric in accordance with claim 4 wherein the fabric is formed having a denier of about 0.01 to 0.02.

* * * * *